(12) United States Patent
Anvekar

(10) Patent No.: US 6,333,735 B1
(45) Date of Patent: Dec. 25, 2001

(54) METHOD AND APPARATUS FOR MOUSE POSITIONING DEVICE BASED ON INFRARED LIGHT SOURCES AND DETECTORS

(75) Inventor: Dinesh Kashinath Anvekar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/317,189

(22) Filed: May 24, 1999

Related U.S. Application Data (63) Continuation-in-part of application No. 09/270,396, filed on Mar. 16, 1999.

(51) Int. Cl.$^7$ .................................................. G09G 5/00
(52) U.S. Cl. ............................................ 345/175; 345/166
(58) Field of Search ................................... 345/173, 175, 345/177, 180–183, 168, 163, 166, 158

(56) References Cited

U.S. PATENT DOCUMENTS

| | | | |
|---|---|---|---|
| 4,868,912 | * | 9/1989 | Doering ................................ 345/175 |
| 4,899,138 | * | 2/1990 | Araki et al. .......................... 345/175 |
| 5,162,783 | * | 11/1992 | Moreno ................................ 345/175 |
| 5,196,835 | * | 3/1993 | Blue et al. ........................... 345/173 |
| 5,424,756 | * | 6/1995 | Ho et al. .............................. 345/175 |
| 5,644,338 | | 7/1997 | Bowen . |
| 5,707,160 | * | 1/1998 | Bowen ................................. 345/175 |
| 5,729,250 | | 3/1998 | Bishop et al. . |
| 5,736,687 | | 4/1998 | Sellers . |
| 5,943,043 | | 8/1999 | Furuhata et al. . |
| 5,977,867 | | 11/1999 | Blouin . |
| 6,008,798 | * | 12/1999 | Mato, Jr. et al. .................... 345/175 |
| 6,205,021 | | 3/2001 | Klein et al. . |

* cited by examiner

*Primary Examiner*—Regina Liang
(74) *Attorney, Agent, or Firm*—McGuireWoods, LLP; Stephen C. Kaufman (57) ABSTRACT

Pointer positioning device based on infrared light sources and detectors that is compact, rugged and ergonomically easy to use such as can be used in laptop computers and similar devices. The pointer positioning device fits in the same area as a conventional touch-pad device in a portable computing device. It detects movement in a movement area by scanning for shadow information with infrared (IR) light sources. To increase the resolution of scanning and to avoid non-uniform beam widths, the scanning of the touchpad area may be carried out by using low power IR laser beams produced by a single IR laser source each for x and y directions and a plurality of optical fibers to transmit the laser beams in the x and y directions. Optionally, this divergency is minimized by positioning IR light sources and light detectors in an alternating pattern around the periphery of a movement area. A mouse device with an opaque plunger depressed with a finger is used as an object to create a well defined shadow in the x and y directions of a movement area.

20 Claims, 12 Drawing Sheets

METHOD AND APPARATUS FOR MOUSE POSITIONING DEVICE BASED ON INFRARED LIGHT SOURCES AND DETECTORS

CROSS-REFERENCE TO RELATED APPLICATION

This application is a continuation-in-part of patent application Ser. No. 09/270,396 filed Mar. 16, 1999, entitled "Method And Apparatus For Mouse Positioning Device Based on Infrared Light Sources And Detector," filed by Dinesh K. Anvekar and assigned to a common assignee (IBM Docket YO998-507), the subject matter of which is incorporated herein by reference.

DESCRIPTION

BACKGROUND OF THE INVENTION

1. Field of the Invention

The present invention generally relates to pointer positioning devices and, more particularly, to an improved pointing device based on infrared light sources and detectors that is compact, rugged and ergonomically easy to use such as can be used in laptop computers and similar devices.

2. Background Description

The conventional mouse is a very useful device for moving the pointer on the computer displays and also for user input. However, for portable computers, it is desirable to provide a small compact input device which can provide the full functionality of the conventional mouse. Ergonomic convenience to the user is a paramount concern. Several types of pointer devices are currently available on different laptops and other portable computers. See S. Zhai, B. A. Smith, and T. Selker, "Improving Browsing Performance: A Study of Four Input Devices for Scrolling and Pointing Tasks," *in Proceedings of INTERACT'97: The 6th IFIP Conference on Human-Computer Interaction*, pp. 286–292, 1997; K. Kawachiya and H. Ishikawa, "NaviPoint: An Input Device for Mobile Information Browsing," *Proceedings of Computer-Human Interaction CHI.98*, 18–23 Apr. 1998, Los Angeles, pp. 1–8; and Microsoft Corp. Microsoft IntelliMouse Home Page at http://www.microsoft.com/products/hardware/mouse/intellimouse/default.htm.

A simple substitute for the conventional mouse found in earlier laptop computers is a miniature tracker ball which is based on electromechanical principles. Lower reliability, difficulty in holding a constant position and wear and tear during usage are the major drawbacks of this device. Another pointer device which is currently provided in IBM and other laptop computers is the TrackPoint® analog input device situated amidst keys on the keyboard. (TrackPoint is a registered trademark of IBM Corp.) See Rutledge, J. D. and Selker, "T Force-to-Motion Functions for Pointing," in *Proceedings of INTERACT '90: The IFIP Conference on Human-Computer Interaction*, pp. 701–705, 1990. This device is based on sensing the forces applied by the user's finger in the x and y directions. While this device is quite satisfactory in terms of pointing function, its use requires dexterity on the part of the user. For this reason, some users prefer laptops with other types of pointing devices. Another limitation of this device is that it does not support double-clicking function available with touch-pad type of pointing devices. The touch-pad pointing device is robust and easy to use. The touch-pad pointing device is currently available in many modern laptop computers. Here, the user moves his or her finger on rectangular area of the touch pad to move the pointer Although the touch-pad devices typically have one, two and sometimes three "mouse" buttons which allow single and double clicking, single-clicking and double-clicking effects can also be achieved by single and double hitter on the touch pad. Wear and tear of the touch pad and sensitivity to touch by different users or condition of the user's finger are some drawbacks of this device,

SUMMARY OF THE INVENTION

It is therefore an object of the invention to provide a new type of pointer device which is more robust and superior to some of the existing pointer devices. The present invention is based on infrared (IR) light sources and detectors. It is similar to the existing touch-pad-type of pointing device available on some laptop computers. Instead of relying on surface sensors to detect finger movement on the touch surface, it measures the relative movement by sensing the shadow of the finger or finger operated object in the movement area.

This new pointing device is superior to existing devices because it is independent of touch sensitivity and is more robust. This new pointing device is superior in terms of wear and tear on the touch surface and insensitivity to user's finger condition. Existing touch-pad devices are based on true touch. The touch surface has a sensor beneath it, and is subject to wear. However, in the present invention, the surface on which the finger is moved has no sensors. It just provides a flat surface for supporting the finger or finger operated object during its motion.

According to a preferred embodiment of the invention, the pointing device comprises an x-direction IR source controller and a y-direction IR source controller and a plurality of x-direction collimated IR light sources and a plurality of y-direction collimated IR light sources. The x and y-direction IR source controllers respectively alternately and sequentially activate the IR light sources in each direction. A plurality of x-direction IR light detectors and a plurality of y-direction IR light detectors receive collimated IR light from corresponding ones of the x-direction and y-direction IR light sources. The IR light sources and detectors are placed alternately along opposite peripheries of a movement area. The movement area of two-dimensions is scanned by the IR light sources such that objects placed in the movement area create shadows detected by said IR light detectors. An x-direction signal processing circuit and a y-direction signal processing circuit respectively receive signals from said x-direction and y-direction IR light detectors producing detector outputs in the x-y directions to be sent to a pointer control circuit controlling a pointer in a screen display area. This invention differs from an earlier IR light based touch pad device disclosed in U.S. Pat. No. 5,707,160 in the alternate placement of IR sources and detectors ro improve resolution of object detection uniformly across the movement area.

According to another preferred embodiment of the invention, to increase the resolution of scanning and to avoid non-uniform beam widths, the scanning of the touchpad area is carried out by using low power IR laser beams produced by a single IR laser source each for x and y directions and a plurality of optical fibers to transmit the laser beams in the x and y directions. The laser beams are sensed through a plurality of optical fibers which direct the light to x and y direction IR laser detectors. As with the earlier scheme, here also the detection of objects placed in the movement area is carried out by analyzing the shadows in the x and y directions.

According to yet another embodiment of the invention, a mouse device with an opaque plunger which can be depressed with a finger is used as an object to create a well defined shadow in the x and y directions. This prevents exposure of a user's finger to the laser beams, and simplifies object detection process and makes it ergonomically more convenient.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
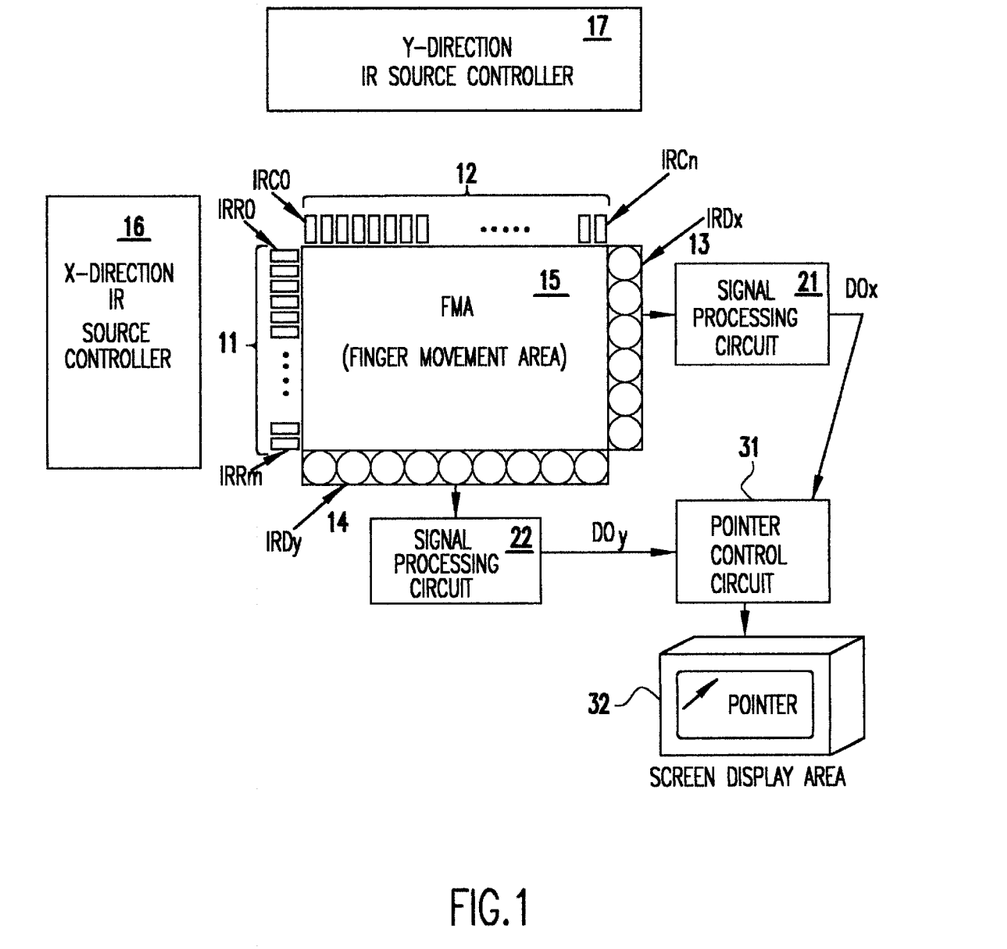
FIG. 1 is a block diagram of an infrared source based pointing device according to a preferred embodiment of the invention.

Referring now to the drawings, and more particularly to FIG. 1, there is shown a schematic diagram of the new pointing device. Here, infrared (IR) light sources 11 labeled IRC0–IRCm (IR rows 0 to m) and infrared light sources 12 labeled IRC0–IRCn (IR columns 0 to n) produce collimated beams of IR light in each of the x and y directions, respectively. Each of these sources can be activated separately and independently, preferably in a sequential scanning pattern. The IR light emitted by any of the IR sources 11 or 12 can be detected by the IR detectors 13 and 14 (IRDx and IRDy) placed at respective opposite sides to IR sources 11 and 12 of the rectangular Finger Movement Area (FMA) 15.

During operation, the FMA 15 is continuously scanned by IR light in both x and y directions from the IR lights sources 11 and 12. The x-direction IR source controller 16 sequentially activates the IR sources 11, while the y-direction IR source controller 17 sequentially activates IR sources 12. Although the actual scan rate is not important, it should be high enough to enable the sensing of the fastest change in finger shadow positions. Outputs from IR detectors 13 and 14 are respectively processed by signal processing circuits 21 and 22 which provide outputs to pointer control circuit 31. The pointer control circuit 31 generates the necessary controls for displaying the pointer on a display screen 32, such as a Liquid Crystal Display (LCD) as commonly used in laptop computers.

Figure 2:
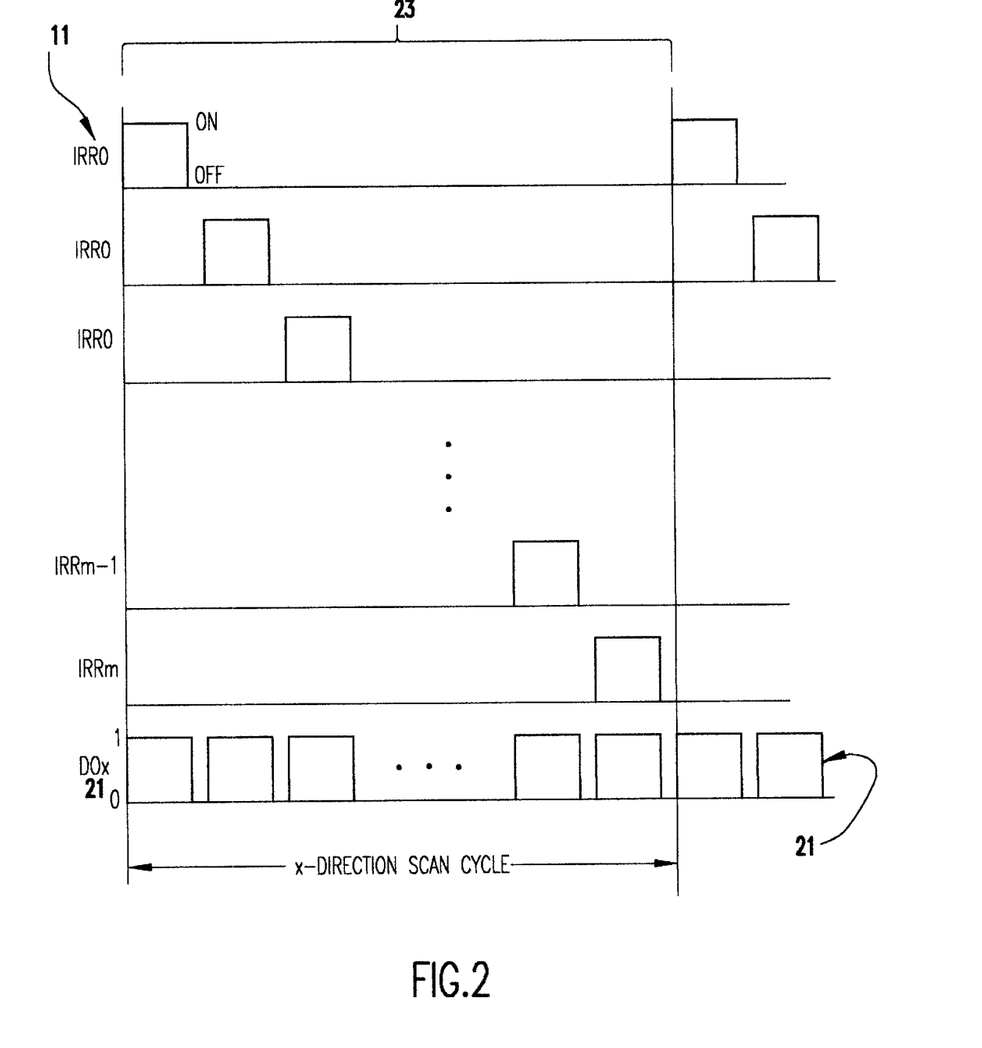
FIG. 2 is a timing diagram showing the scan cycle of IR activation and IR detector output.

FIG. 2 shows the corresponding activation signals 23 from IR source controller 16 to the IR sources 11 and x-direction detector outputs 21 from IR detectors 13. The signals for the IR source controller 17 to IR sources 12 and the corresponding outputs from the IR detectors 14 are similar and therefore not shown. As seen in FIG. 2, assuming that the IR light is unobstructed in the FMA 15, the IR detector output DOx at 21 is a 1 during all the IR source activation periods.

Figure 3:
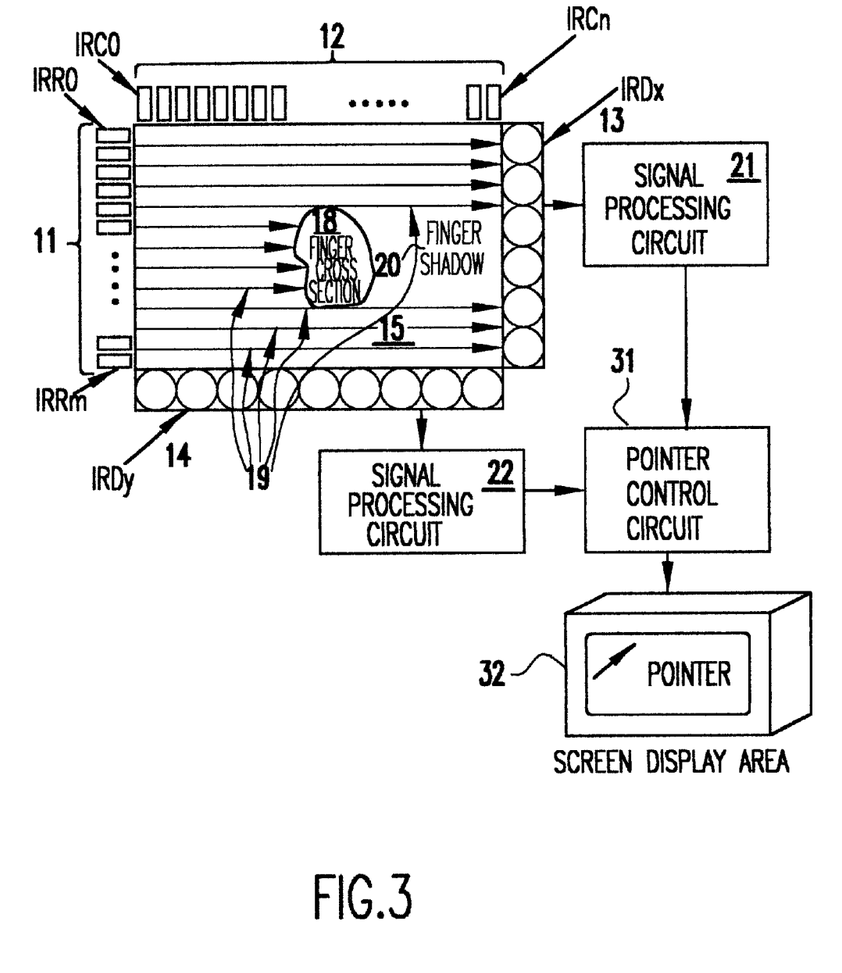
FIG. 3 is a block diagram showing the finger movement area of FIG. 1 illustrating finger position detection through finger shadow.

When a user places his finger in the FMA 15, the IR light from some IR sources does not reach the corresponding IR detectors. As an illustration, FIG. 3 shows the situation when a finger 18 is placed in the FMA 15. For simplicity, only x-direction IR rays 19 are shown. Also, a time-integrated picture with all the rays 19 is shown, but in practice, the IR rays are generated sequentially. As is shown in FIG. 3, the placement of the finger produces a shadow 20 on corresponding ones of IR detectors 13. Similarly, a finger shadow (not shown for reasons of simplicity of illustration) is produced on certain ones of IR detectors 14 during the y-direction scan. It is to be noted that x and y direction scans are performed alternately and therefore the reflected rays from the finger falling on IR detectors 13 (and alternatively, IR detectors 14) during x-direction (y-direction) scans are ignored.

Now, it is easy to see that after every x-y scan cycle, the 0-bits obtained from IR detectors 13 and 14 provide the information about the finger shadow. In practice, the bits corresponding to finger edges can oscillate between 0 and 1. This fluctuation can be handled by using some sort of hysteresis, or fuzzy logic, or some standard image recognition techniques.

As described above, the shadow 20 of the finger 18 can be detected continuously by observing the IR signal processing circuit outputs 21 and 22. Now, if the finger 18 is moved over the FMA 15, its shadow 20 also moves correspondingly in the x and y directions. The outputs of signal processing circuits 21 and 22 are fed into a pointer control circuit 31 in order to control the pointer movement in a screen display area 32.

For those skilled in the art, it is easy to see that the pointer position can be controlled easily based on the relative movements of the finger shadows. It is possible to change the sensitivity by appropriately scaling the number of bits of shadow movement to the number of pixels of pointer movement. Also, the resolution can be changed by choosing the number of infrared sources 11 and 12 in each direction.

It should also be noted that multiple IR detectors are not required to practice the present invention. One IR detector each in x and y directions is sufficient. Also, while it is possible to use fiber optics with one or two IR sources and split into one or several beams, this embodiment will require a more complicated method for optically switching the IR light to the appropriate fiber output.

As mentioned above, this new technique supports the double clicking function as available in touch pad type of pointing devices. Because it is not easy to distinguish between the placing of a finger to move the pointer and single clicking, single clicking is usually done through one of the "mouse" switches (not shown). Double clicking, however, can be recognized by a short period with no finger shadows occurring between two states with finger shadows.

Figure 4A:
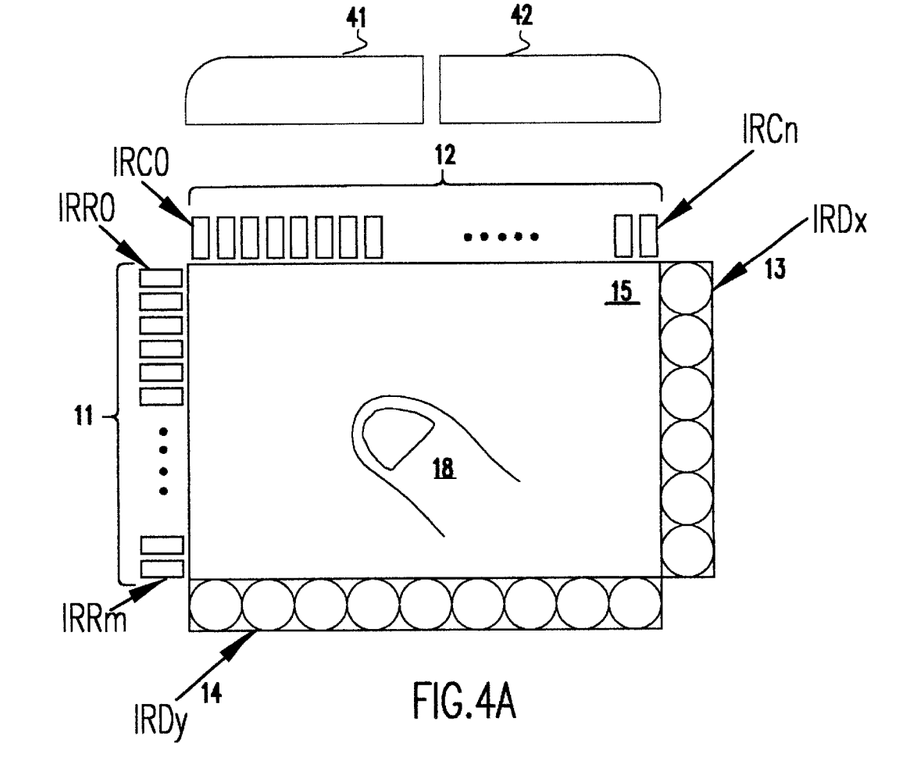
FIGS. 4A and 4B are respectively a plan view and a cross-sectional side view of an exemplary physical implementation of the pointer device according to the invention.
Figure 4B:
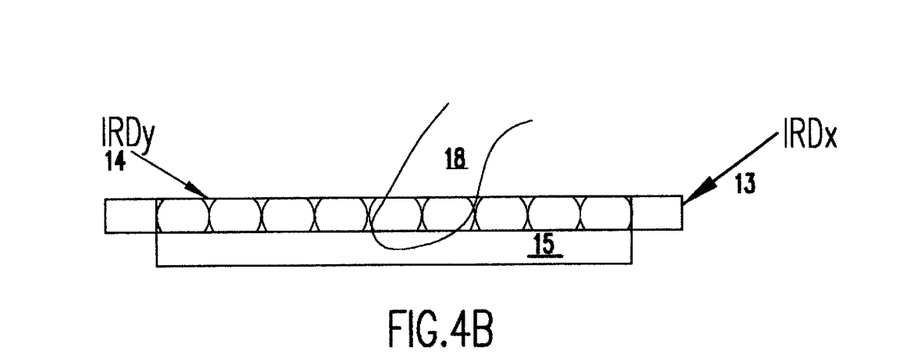

In practice, the new mouse positioning device can be implemented in existing laptop computers and similar devices in the same area as occupied by the touch pad pointing device. FIGS. 4A and 4B show some details about an exemplary physical implementation. FIG. 4A is a plan view showing the mouse movement device comprising the FMA 15, IR light sources 11 and 12, and IR detectors 13 and 14, as in FIG. 1. The IR light sources 11 and 12 and the IR detectors 13 and 14 would not be visible to the user since these would be covered by the keyboard housing. Only the FMA 15 would be exposed by an opening in the keyboard housing. Adjacent the FMA 15 are two "mouse" keys 41 and 42. In the example shown, these "mouse" keys are positioned above the FMA 15 but could also be located just below the FMA 15 or some other convenient location for quick access by the user's finger. As shown in the cross-sectional side view of FIG. 4B, the finger movement area (FMA) is not very deep. One can see that only the tip of the finger 18 is necessary to be placed in the movement area 15 to create a shadow. From the relative sizes of the finger 18, sensors 11 and 12 and the detectors 13 and 14, it can be seen that the entire mouse positioning device will easily fit into the appropriate area of a laptop computer or similar device.

Figure 5:
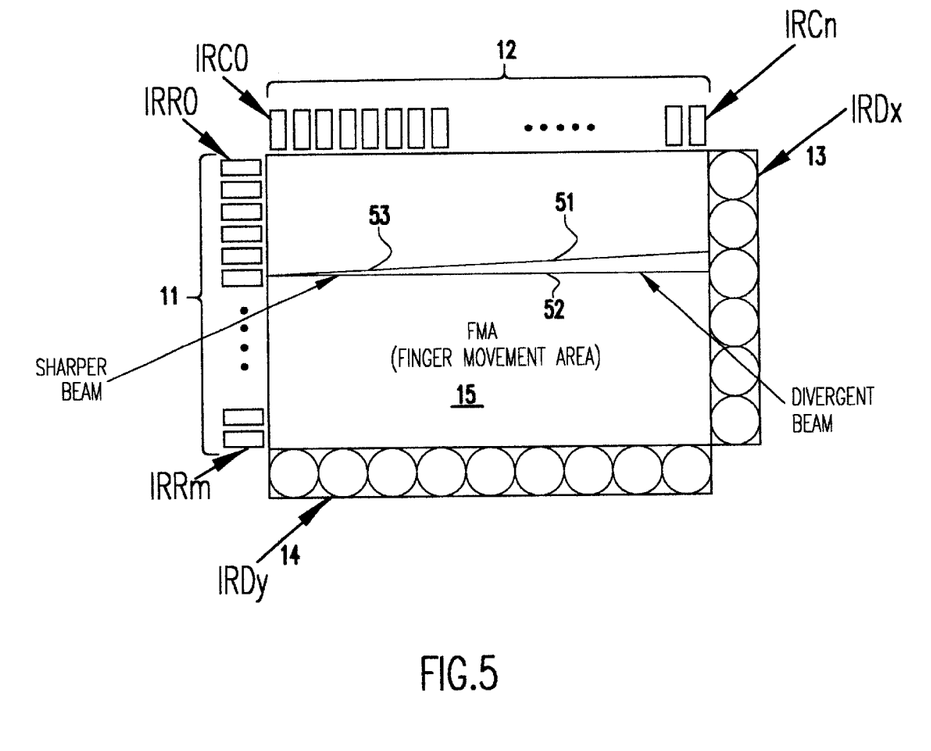
FIG. 5 is a block diagram of an infrared source based pointing device showing non-uniform beam widths across the Finger Movement Area according to the invention.

In the above described touch pad and other IR based touchpads, for instance as described in U.S. Pat. No. 5,707,160, IR light beams are sharper at regions nearer to the IR sources than at the regions nearer to the IR detectors since collimation of the IR beams is not perfect. FIG. 5 shows the FMA 15, IR light sources 11 and 12, an IR detectors 13 and 14. An x-direction IR beam 51 starts out sharp, but begins to diverge at 53 and produces a divergent beam 52 as it reaches the IR detectors 13. This divergency leads to non-uniformity for detecting edges of finger or finger operated objects across the FMA 15. The present invention minimizes this problem by placing the IR sources and detectors alternately along both the opposite peripheries of the FMA, as shown in FIG. 6.

Figure 6:
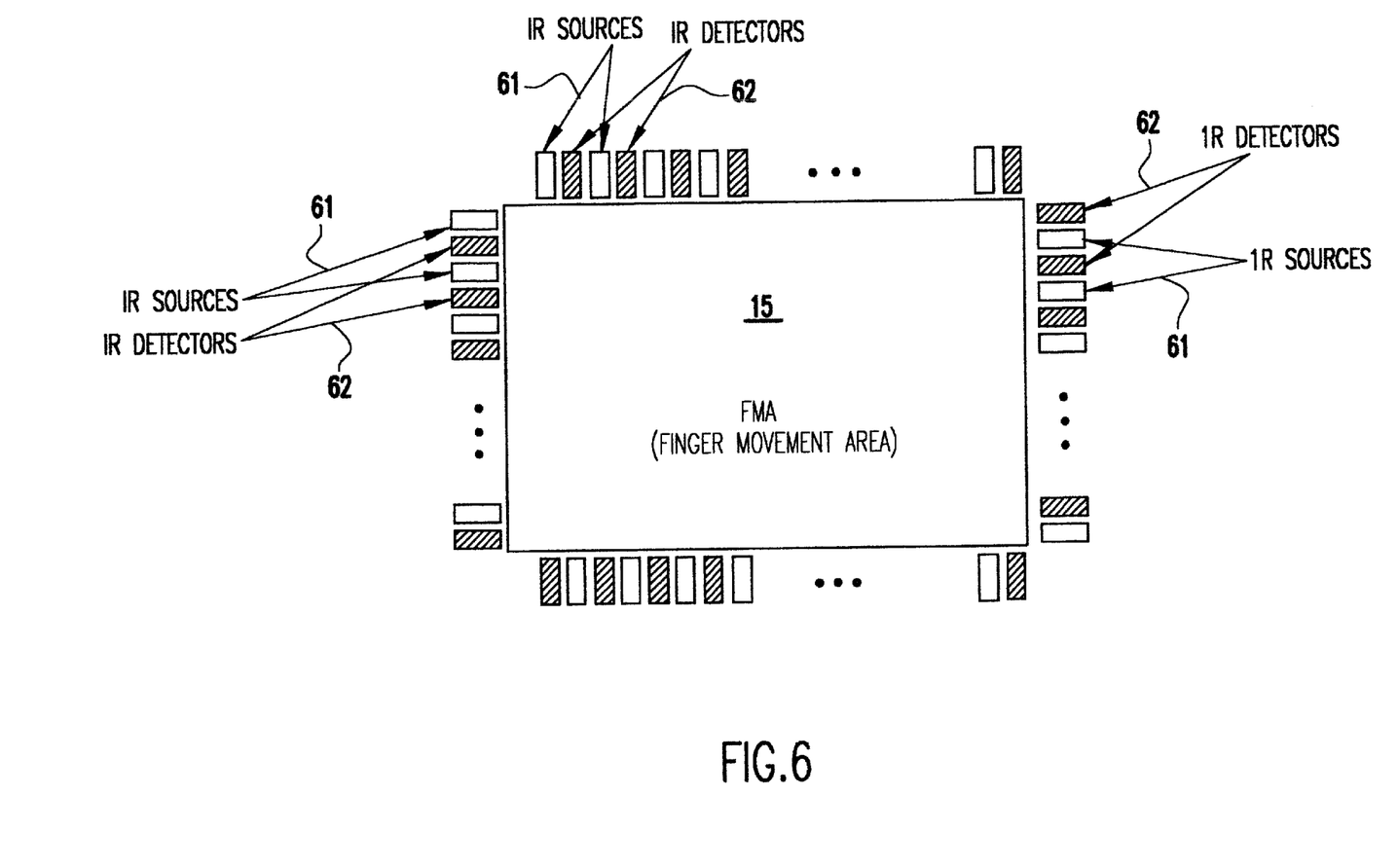
FIG. 6 is a block diagram of an infrared source based pointing device showing alternate positioning of IR sources and detectors according to the invention.

In FIG. 6, IR sources 61 are shown as open rectangles, alternately placed with IR detectors 62 which are shown as solid black rectangles. The IR sources 61 and IR detectors 62 are placed all along the periphery of the FMA 15, in both the x and y directions.

Figure 7:
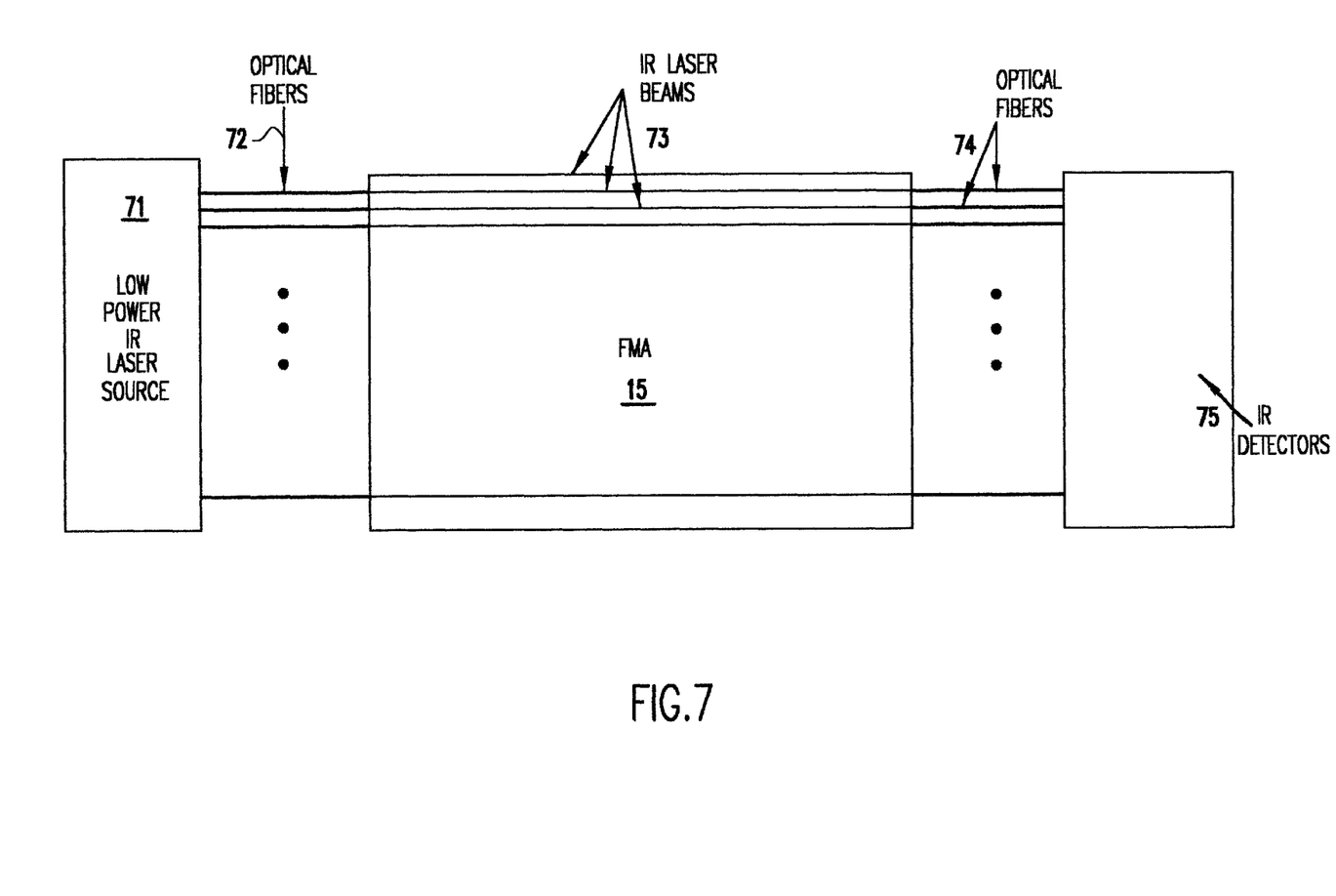
FIG. 7 is a block diagram of an infrared source based pointing device showing an IR laser scanning subsystem for the x direction according to the invention.

Alternatively, the problem of non-uniform resolution for finger or object detection can be solved by using low power IR laser beams which have a uniform beam width for considerable distances. This approach has a further advantage that by using very thin optical fibers, a very large number of light beams than possible with discrete IR sources can be produced for higher resolution scanning. FIG. 7 shows a schematic of such a touchpad arrangement. Here, for simplicity in illustration, only the x-direction laser beams system has been shown. A similar arrangement of y-direction beams is provided, also. The low power IR laser source 71 generates beams that pass through the optical fibers 72. The x-direction laser beams 73 travel across the FMA 15. Non-obstructed beams are recaptured by optical fibers 74 and detected by IR detectors 75.

Although the IR laser beams used are of very low power, prolonged exposure to them by a user's finger is not desirable. Therefore, the use of a bare finger must be avoided by providing some other object to be moved by the finger. Further, the use of a bare finger has a basic problem because the cross section of a finger varies widely among users.

Figure 8:
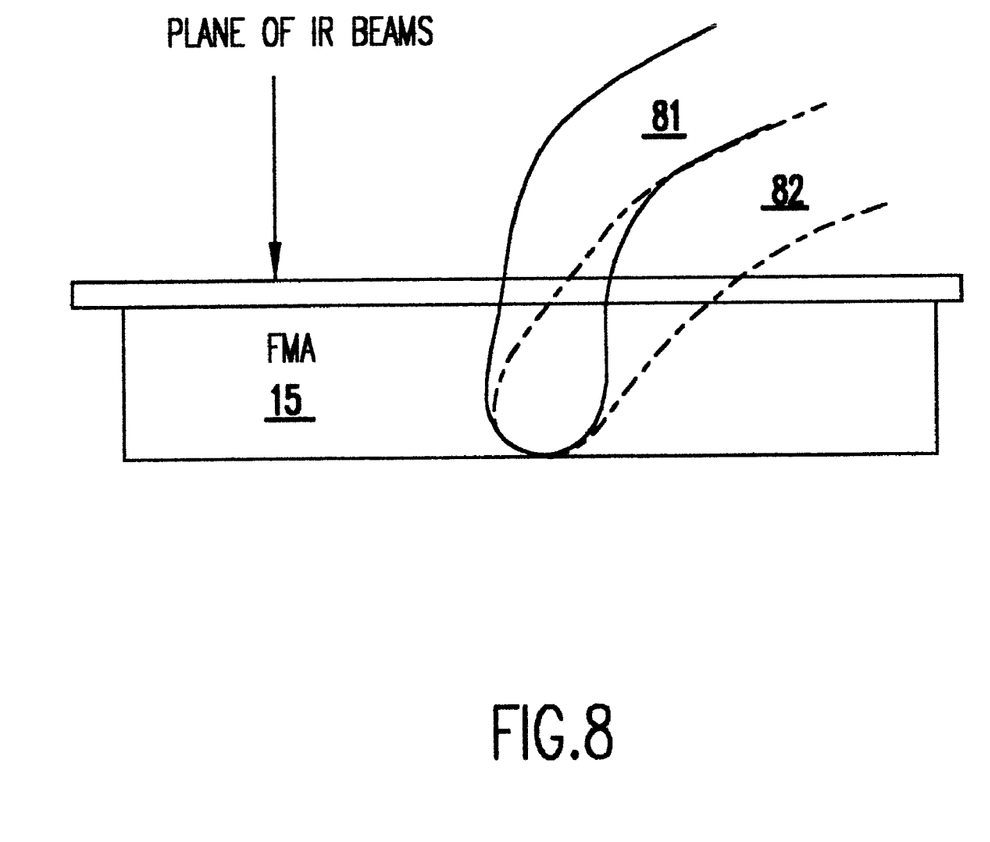
FIG. 8 is a block diagram of an infrared source based pointing device showing different finger cross sections for different angles of inclination.

Another problem with using fingers for detection is shown in FIG. 8. A finger 81 is shown wherein the tip of the finger is almost perpendicular to the FMA 15. A second finger 82 is shown at a different inclination. The device must be able to detect movement of the finger regardless of the inclination and shape of a finger. At the time of insertion or removal from the FMA, the finger cross sections could be at either angle of inclination. Also, at the time of insertion and removal from the FMA 15, the finger cross sections seen by the detection system change rapidly, leading to jitter in the position of the cursor.

Figure 9A:
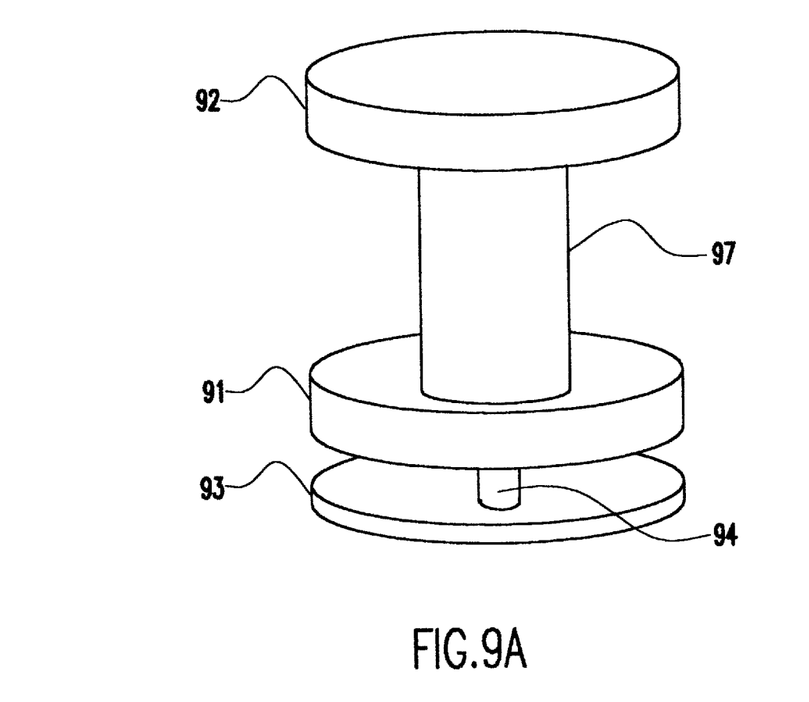
FIG. 9A is a schematic of the optical mouse device according to the invention.
Figure 9B:
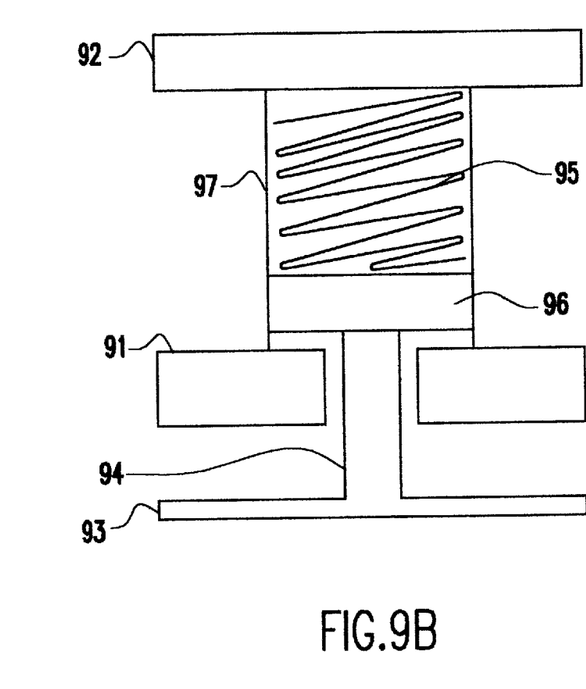
FIG. 9B is a cross section of the optical mouse device as shown in FIG. 9A.

Considering these limitations, an improved mouse device is now described. FIG. 9A shows a schematic diagram of the new mouse device and FIG. 9B shows the cross section of the device shown in FIG. 9A. The device has an opaque plunger 91 which can be depressed by pressing the button 92 on the top. At the bottom is a base disk 93 with a central stock 94. Normally the plunger is kept in the lifted position by the spring 95 acting on the button 92 which is attached to the plunger 91 by a hollow cylindrical member 97. The piston 96 attached to the stock 94 guides the cylindrical member 97 for vertical movement. Similarly, the stock 94 guides the plunger 91 to move vertically.

Figure 10A:
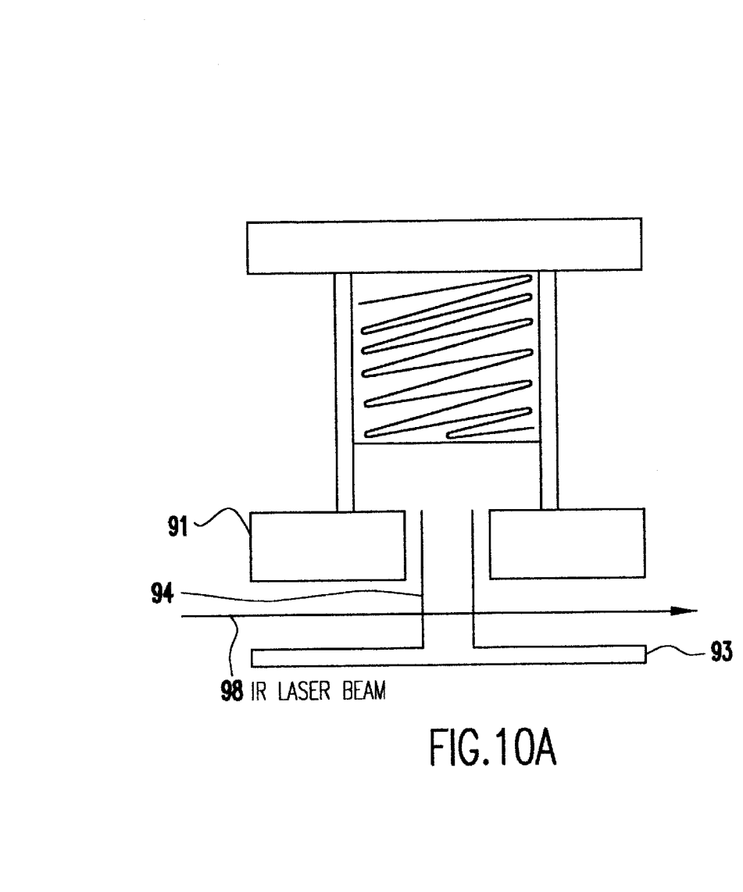
FIG. 10A, is a cross section of an optical mouse device showing an IR laser beam in its path.
Figure 10B:
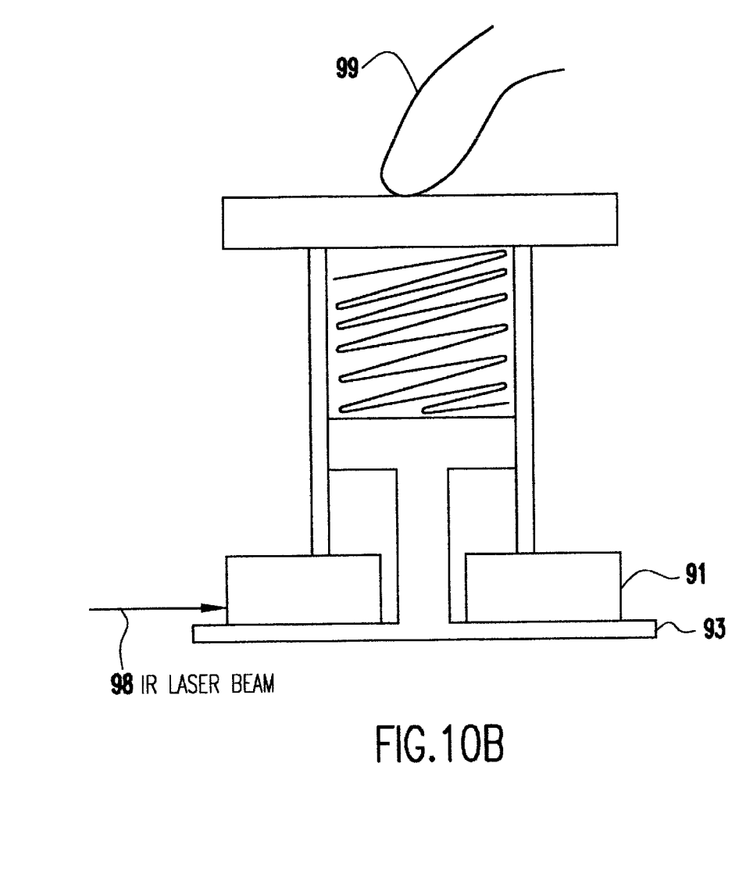
FIG. 10B, is a cross section of the optical mouse device with the plunger depressed, showing an IR laser beam in its path.
Figure 10C:
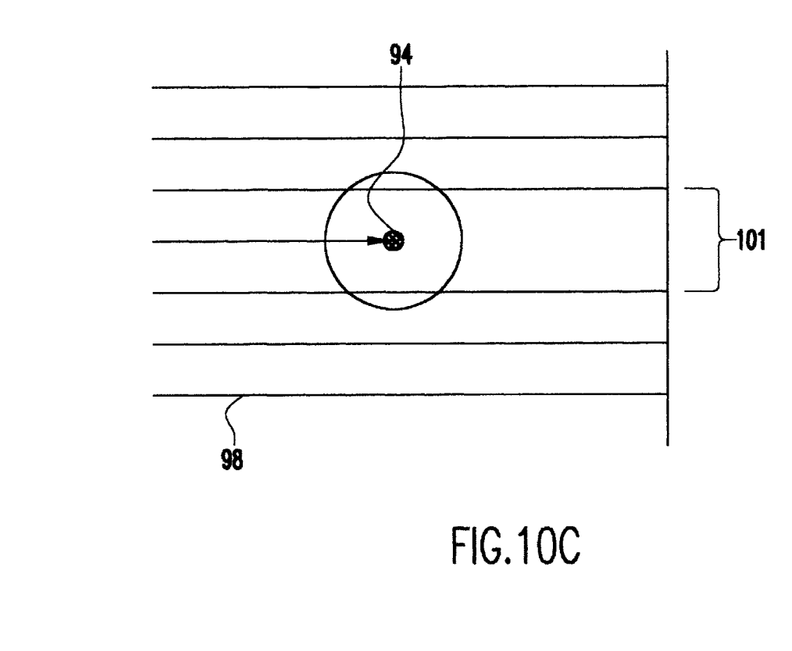
FIG. 10C illustrates the shadow created by an optical mouse device.
Figure 10D:
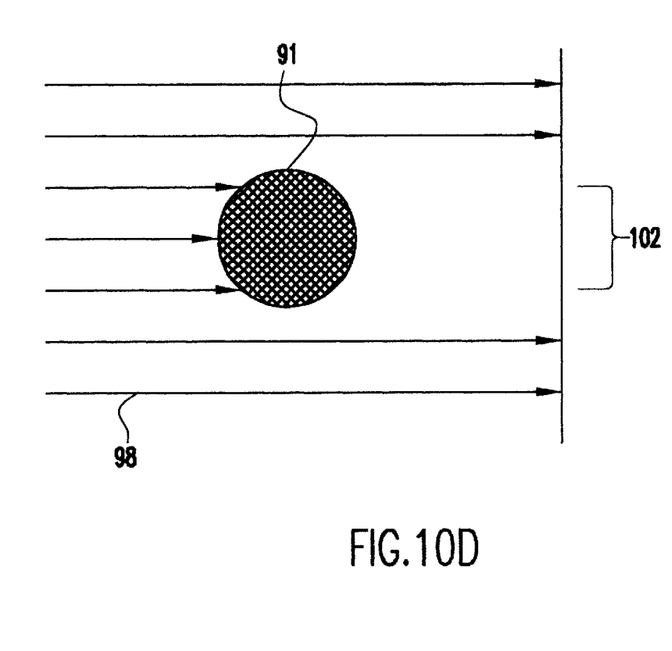
FIG. 10D illustrates the shadow created by an optical mouse device with its plunger depressed.

Now referring to FIGS. 10A and 10B, in the normal condition with the plunger 91 uplifted, as shown in FIG. 10A, IR laser beams 98 in a plane between the base disk 93 and the plunger 91 pass through unobstructed, with the exception of those beams in the path of the central stock 94. When the plunger 91 is depressed by a finger 99, as shown in FIG. 10B, the opaque plunger 91 blocks any laser beams 98 from passing through to the other side. Referring now to FIG. 10C, it may be noted that the shadow 101 of the IR laser beams 98 is narrow, corresponding to the width of the central stock 94 when the plunger is in the normal position. When the plunger 91 is depressed, as shown in FIG. 10D, a broader shadow 102 is produced. Therefore, it is possible to determine whether the plunger is depressed or not, by observing the width of the shadow 101 or 102.

Figure 11A:
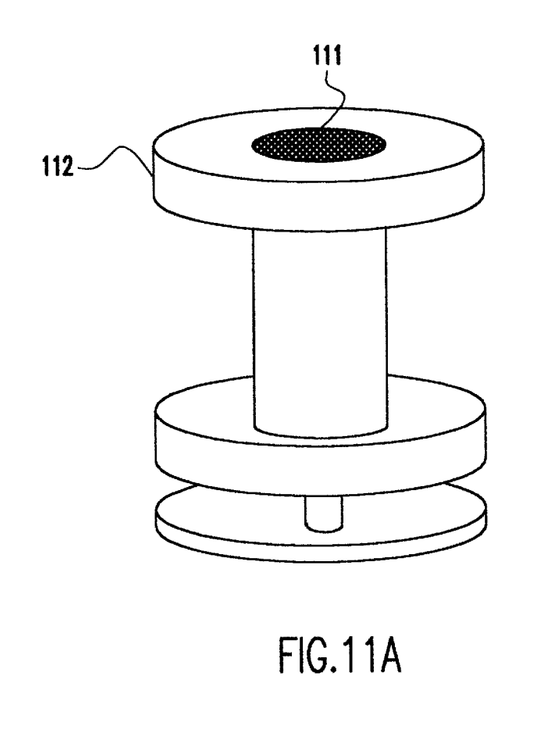
FIGS. 11A, 11B and 11C show various button heads of an optical mouse device.
Figure 11B:
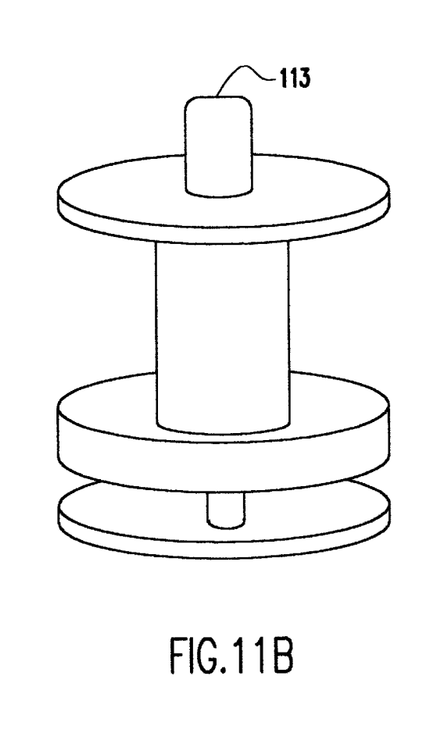
Figure 11C:
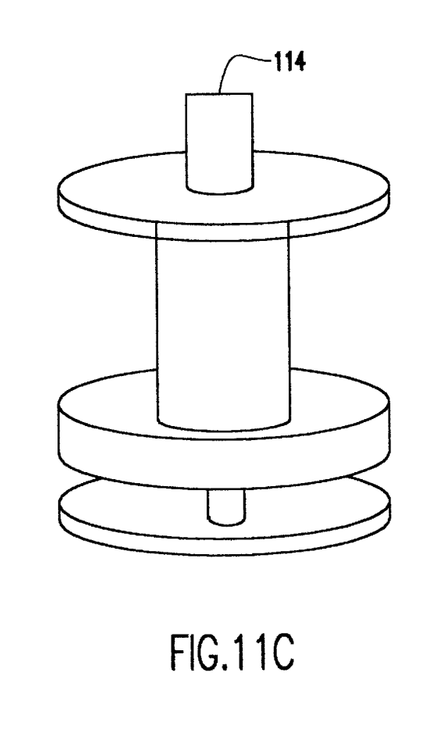

The mouse device is placed on an FMA and moved by using a single finger or by holding the button with two or three fingers. The button may be designed for convenience of holding as shown in FIGS. 11A, 11B and 11C. FIG. 11A shows a design where the device has a depression 111 in the button 112, allowing easy movement using one finger. FIGS. 11B and 11C show a rounded and square finger grip 113 and 114, respectively. The finger grip takes the place of a button. Further, in order to ensure that the mouse device sits firmly on the FMA, it is possible to provide an FMA made of some magnetic material and the base disk can be made of a flat magnet. In this case, the strength of the base disk magnet should be weak enough to enable sliding of the device on the FMA.

In the mouse device, activation of cursor control is achieved by pressing the button and moving the device across the FMA. For scanning the FMA, the x-direction beams are turned on all at once, and plunger depression/ position in the x-direction is checked. Next, all the y-direction beams are turned on all at once, and plunger depression/position in the y-direction is checked. This alternate sequence x and y direction plunger position checking is repeated at a rate fast enough to detect the movement of the device. Sequential scanning as described earlier is possible in this case also, but the optical arrangement to switch IR laser beams is generally complicated and expensive. This optical mouse device has the advantage that its shadows in the x and y directions have a constant width which is equal to the diameter of either the plunger 91 or the stock 94. This greatly simplifies the process of determination of x and y coordinates of the device on the FMA. Also, the insertion and removal of the plunger from the plane of IR laser beams is always in the vertical direction, and therefore there is no jitter in the final position of the cursor. While the device is particularly suited for use with IR laser beams, it can also be used with normal IR light source based touchpad devices.

From the foregoing description, it should be clear for those skilled in the art that the position and rate of motion of the said mouse device on the FMA can be easily determined to control the position of cursor on the display screen. In the mouse, the action of lifting a conventional mouse and moving from a different starting position is achieved by releasing the button, moving the mouse to a new position, and starting movement with button depressed. Also double clicking is achieved by just double clicking of the mouse button.

While the invention has been described in terms of the above discussed preferred embodiments, those skilled in the art will recognize that the invention can be practiced with modification within the spirit and scope of the appended claims.

Having thus described my invention, what I claim as new and desire to secure by Letters Patent is as follows:

1. A pointing device for use in computing devices comprising
    means for producing scanned infrared (IR) light in first and second dimensions over a movement area;
    means for detecting movement of an object in said movement area using shadow information in said first and second dimensions and generating a detector output, wherein said shadow information is produced by a mouse device, comprising:
        a button assembly, wherein depressing a button on said button assembly causes a plunger to create a shadow in said movement area;
        a base assembly, said base assembly moving freely in two dimensions over said movement area; and
        means for connecting said button assembly to said base assembly; and
    means for converting the detector output to position information associated with a pointer on a screen display area.

2. A pointing device for use in computing devices as recited in claim 1, wherein said base assembly comprises:
    a base disk;
    a piston;
    a center stock having a first end connected to said base disk, and a second end connected to said piston.

3. A pointing device for use in computing devices as recited in claim 2, wherein said base disk is weakly magnetic and said movement area has a horizontal magnetic surface for stable positioning of said base disk on said movement area.

4. A pointing device for use in computing devices as recited in claim 2, wherein said button assembly comprises:
    a button;
    a plunger;
    an hollow member having a first end connected to said button and a second end connected to said plunger.

5. A pointing device for use in computing devices as recited in claim 4, wherein said button assembly allows a user to grip said button easily with one or more fingers, facilitating movement of said mouse device in two dimensions over said movement area.

6. A pointing device for use in computing devices as recited in claim 5, wherein said button has a depression on its surface, resulting in a comfortable finger grip, allowing said mouse device to be moved easily with one finger.

7. A pointing device for use in computing devices as recited in claim 5, wherein said button extends upward as a stock and is easily gripped by two or more fingers.

8. A pointing device for use in computing devices as recited in claim 4, wherein said means for connecting said button assembly to said base assembly positions said base assembly interposed within said button assembly, said piston positioned within said hollow member and said center stock moving freely through a hole in said plunger when said plunger is depressed and released, wherein said plunger is in an upward position at rest and in a downward position when pressure is applied to said button, allowing said piston to move freely within said hollow member.

9. A pointing device for use in computing devices as recited in claim 8, wherein said means for connecting said button assembly to said base assembly further comprises a spring assembly located within said hollow member, acting to produce at rest pressure against both said piston and said button, said spring assembly allowing said plunger to be depressed by applying pressure from a finger to said button.

10. A pointing device for use in computing devices as recited in claim 1, wherein said means for detecting movement comprises a plurality of x-direction IR light detectors, and a plurality of y-direction IR light detectors, wherein when said plunger is depressed it creates a broad shadow of known properties which is different from a narrow shadow produced when said plunger is not depressed, said broad shadow detected by said x-direction IR light detectors or said y-direction IR light detectors, generating a detector output showing movement when said plunger is depressed and ignoring movement when said plunger is not depressed.

11. A pointing device for use in computing devices which minimizes the effect of beam spreading and enables a uniform detection resolution, comprising:
    an x-direction infrared (IR) source controller and a y-direction IR source controller;
    a plurality of x-direction IR light sources and a plurality of y-direction IR light sources, said x and y-direction IR source controllers respectively alternately and sequentially activating the IR light sources in each of the x and y-directions;
    a plurality of x-direction IR light detectors, and a plurality of y-direction IR light detectors, wherein said x-direction light sources are alternately located with said x-direction light detectors on both opposite sides of a movement area, and said y-direction light sources are alternately located with said y-direction light detectors on both opposite sides of said movement area being substantially perpendicular to said x-direction light sources and said x-direction light detectors;
    a movement area of two-dimensions in x and y scanned by said IR light sources creating shadows whereby objects placed in said movement area create shadows detected by said IR light detectors; and an x-direction signal processing circuit and a y-direction signal processing circuit respectively receiving signals from said x-direction and y-direction IR light detectors producing detector outputs in x-y directions to be sent to a pointer control circuit controlling a pointer in a screen display area, wherein said object placed in the movement area comprises:
  a button assembly, wherein depressing a button on said button assembly causes a plunger to create a shadow in said movement area;
  a base assembly, said base assembly moving freely in two dimensions over said movement area; and
  means for connecting said button assembly to said base assembly.

12. A pointing device for use in computing devices as recited in claim 11, wherein said base assembly comprises:
  a base disk;
  a piston;
  a center stock having a first end connected to said base disk, and a second end connected to said piston.

13. A pointing device for use in computing devices as recited in claim 12, wherein said button assembly comprises:
  a button;
  a plunger;
  an hollow member having a first end connected to said button and a second end connected to said plunger.

14. A pointing device for use in computing devices as recited in claim 13, wherein said means for connecting said button assembly to said base assembly positions said base assembly interposed within said button assembly, said piston positioned within said hollow member and said center stock moving freely through a hole in said plunger when said plunger is depressed and released, wherein said plunger is in an upward position at rest and in a downward position when pressure is applied to said button, allowing said piston to move freely within said hollow member.

15. A pointing device for use in computing devices as recited in claim 14, wherein said means for connecting said button assembly to said base assembly further comprises a spring assembly located within said hollow member, acting to produce at rest pressure against both said piston and said button, said spring assembly allowing said plunger to be depressed by applying pressure from a finger to said button.

16. A pointing device for use in computing devices comprising:
  infrared (IR) means for producing scanned IR light in first and second dimensions over a movement area, wherein said IR means includes a low power IR laser source, a first plurality of optical fibers directing IR light beams across a movement area, and a second plurality of optical fibers located on an opposite side of said movement area capturing IR light emitted from said first plurality of optical fibers;
  means connected to said second plurality of optical fibers for detecting movement of an object in said movement area using shadow information in said first and second dimensions and generating a detector output; and
  means for converting the detector output to position information associated with a pointer on a screen display area
  wherein all IR light beams in first said dimension are turned on or off simultaneously with alternate on and off conditions for IR light beams in said second dimension.

17. A pointing device for use in computing devices as recited comprising
  infrared (IR) means for producing scanned IR light in first and second dimensions over a movement area, wherein said IR means includes a low power IR laser source, a first plurality of optical fibers directing IR light beams across a movement area, and a second plurality of optical fibers located on an opposite side of said movement area capturing IR light emitted from said first plurality of optical fibers;
  means connected to said second plurality of optical fibers for detecting movement of an object in said movement area using shadow information in said first and second dimensions and generating a detector output; and
  means for converting the detector output to position information associated with a pointer on a screen display area,
  wherein said shadow information is produced by a mouse device comprising:
    a button assembly, wherein depressing a button on said button assembly causes a plunger to create a shadow in said movement area;
    a base assembly, said base assembly moving freely in two dimensions over said movement area; and
    means for connecting said button assembly to said base assembly.

18. A method for detecting movement in a movement area used for positioning pointer on a screen display area comprising the steps of:
  producing collimated infrared (IR) light beams in first and second dimensions over a movement area;
  detecting movement of a plunger device in said movement area using shadow information in said first and second dimensions, said plunger device having a button assembly, wherein depressing a button on said button assembly causes a plunger to create a shadow in said movement area, a base assembly, said base assembly moving freely in two dimensions over said movement area, and means for connecting said button assembly to said base assembly; and
  converting detected movement to position information associated with a pointer on a screen display area.

19. A method for detecting movement in a movement area used for positioning pointer on a screen display area as recited in claim 18, wherein the step of detecting movement wherein detection of rapid multiple depressing and releasing movements of said button is interpreted as a double click.

20. A method for detecting movement in a movement area used for positioning pointer on a screen display area as recited in claim 18, wherein said plunger device is moved in two dimensions in said movement area by applying pressure from one or more fingers.

* * * * *